(12) United States Patent
Chen

(10) Patent No.: US 7,427,173 B2
(45) Date of Patent: Sep. 23, 2008

(54) POWER GENERATION SYSTEM UTILIZING WIND DRAFT FROM VEHICULAR TRAFFIC

(76) Inventor: Taiming Chen, 150 Forest Hill Dr., Los Gatos, CA (US) 95032

( * ) Notice: Subject to any disclaimer, the term of this patent is extended or adjusted under 35 U.S.C. 154(b) by 0 days.

(21) Appl. No.: 11/431,065

(22) Filed: May 9, 2006

(65) Prior Publication Data

US 2007/0059097 A1 Mar. 15, 2007

Related U.S. Application Data

(60) Provisional application No. 60/718,131, filed on Sep. 15, 2005.

(51) Int. Cl.
*F03D 3/04* (2006.01)

(52) U.S. Cl. .............. 404/71; 290/44; 290/55; 415/4.2

(58) Field of Classification Search ........... 290/1 R, 290/44, 55; 404/6, 71; 310/339; 415/2.1, 415/4.2
See application file for complete search history.

(56) References Cited

U.S. PATENT DOCUMENTS

| | | | | |
|---|---|---|---|---|
| 4,200,904 A | * | 4/1980 | Doan | 362/183 |
| 4,321,476 A | * | 3/1982 | Buels | 290/55 |
| 5,137,416 A | * | 8/1992 | Mohrman | 415/2.1 |
| 5,272,378 A | * | 12/1993 | Wither | 290/1 R |
| 5,512,787 A | * | 4/1996 | Dederick | 290/4 R |
| 6,409,467 B1 | * | 6/2002 | Gutterman | 415/4.3 |
| 6,809,432 B1 | * | 10/2004 | Bilgen | 290/55 |
| 7,098,553 B2 | * | 8/2006 | Wiegel et al. | 290/55 |
| 7,163,325 B2 | * | 1/2007 | Kojima et al. | 362/540 |
| 7,193,332 B2 | * | 3/2007 | Spinelli | 290/1 R |

FOREIGN PATENT DOCUMENTS

| | | | |
|---|---|---|---|
| DE | 102 04 710 | * | 8/2003 |
| DE | 103 30 601 | * | 2/2005 |
| WO | 01/31196 | * | 5/2001 |
| WO | 2005/003553 | * | 1/2005 |

* cited by examiner

*Primary Examiner*—Gary S Hartmann

(57) ABSTRACT

A system for electrical power generation by utilizing wind draft force from vehicle traveling on roadways provide two types of wind turbine apparatuses, one type is for road side which sits along the side of a roadway; another type is for road center which is installed along at traffic divider line at middle of a roadway. When vehicle moves at high speed, lots energy is used to push away air in its way. By setting wind turbines on road side and middle of road, some portions of the wasted energy can be re-captured.

5 Claims, 5 Drawing Sheets

POWER GENERATION SYSTEM UTILIZING WIND DRAFT FROM VEHICULAR TRAFFIC

CROSS-REFERENCE TO RELATED APPLICATIONS

This application is related to and claims priority from U.S. Provisional Patent Application Ser. No. 60/718,131 filed on Sep. 15, 2005. The content of the Application is incorporated into present invention as a part of the specification.

FIELD OF THE INVENTION

The present invention relates power generation, and in particular, to a systems for electrical power generation by utilizing wind draft force from vehicle traveling on roadways.

BACKGROUND OF THE INVENTION

Energy sources used in for generation of electricity include wind, water, solar, nuclear and chemical reactions have been developed for using such energy to generate electricity, typically by performing useful work to drive an electric generator.

Chemical reaction, in particular, fuel burning consumes limited natural resources and produces unwanted wastes.

Many efforts have been made to exploit previously unused energy sources. Many methods and systems have been proposed to use existing forces or mechanical work to generate electrical power.

In particular, several systems and methods have been developed to capture and use the kinetic energy contained within the wind.

Due to the fact that natural wind speed does not exceed just several miles per hour at most of times, to commercially adopt a wind powered electricity generator typically requires a large scale device. Such as a wind impeller. A book entitled *Wind Power for Home & Business—Renewable Energy for 1990 and Beyond* by Paul Gipe provides a detailed description about using wind impellers as wind powered generators, for example.

Another category of wind powered devices include wind turbine type with the rotational axis being generally perpendicular to the wind flow direction.

These devices are designed by using natural wind in mind, which has relatively low speed and most importantly, and is unidirectional.

BRIEF SUMMARY OF THE INVENTION

The purpose of the invention is to capture energy in wind draft generated by high speed moving vehicles on roadway. When vehicle moves at high speed, lots energy is used to push away air in its way. By setting up wind turbines on road side and middle of road, some portions of the wasted energy can be re-captured.

The main features of the present invention are to provide two types of wind turbine apparatuses, one type is for road side which sits along the side of a roadway; another type is for road center which is installed along at traffic divider line at middle of a roadway.

A road center wind turbine apparatus that is able to capture wind draft in opposite directions on each side of a road. The road center wind turbine apparatus has two air flow conduits, one for each side of road. Both conduits extend horizontally along road way traffic. Each conduit has an inlet opening, an outlet opening and a middle opening. The inlet opening opens toward the opposite direction of roadway traffic on its side. The outlet opening opens toward the direction of roadway traffic on its side. The middle opening allows wind turbine blades to work with air flow travels through this conduit.

A road side wind turbine apparatus is similar to a road center apparatus, except it only faces one side of traffic, therefore one air flow conduit and only one set of inlet, outlet openings.

DETAILED DESCRIPTION OF THE PREFERRED EMBODIMENT

Figure 1:
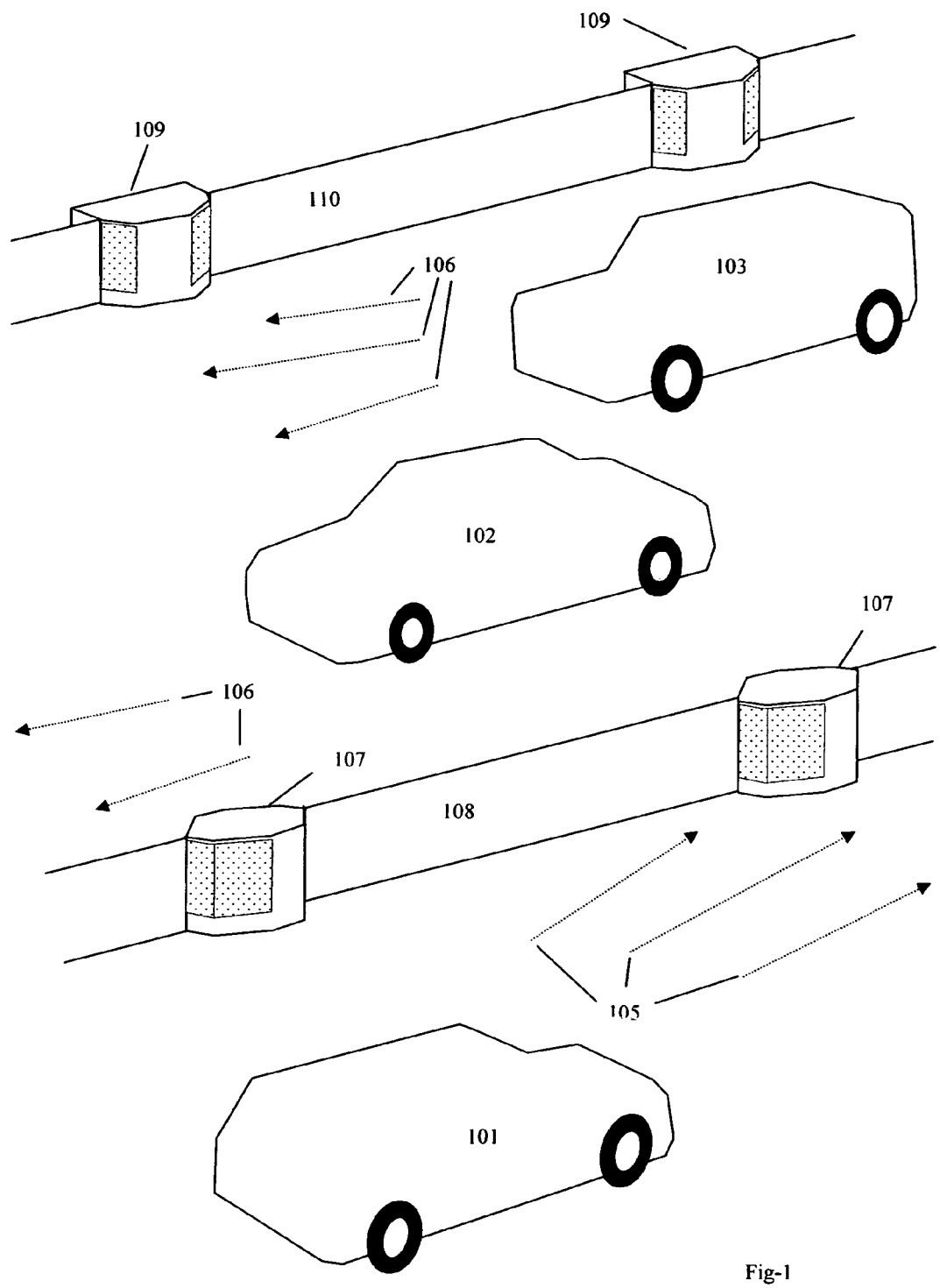
FIG. 1 is a perspective view of a serious of wind turbine apparatuses of the present invention which are located on side and center of a roadway with vehicles traveling on it.

Prior to the more detailed description of the present invention, it should be noted that, for the sake of clarity and understanding, identical components which have identical functions have been identified with identical reference numerals throughout the several views illustrated in the drawing figures.

The wind power generation system as show in FIG. 1 is cooperated with a two-way highway where vehicles 101, 102, 103 travel at both sides of highway with opposite directions. FIG. 1 also shows two types of wind turbine apparatuses, a road center wind turbine apparatus 107 and a road side wind turbine apparatus 109. Vehicles 101, traveling at first traffic direction, generate wind draft 105 at first direction. Vehicles 102, 103, traveling at second traffic direction, generate wind draft 106 at second direction. An air flow barrier wall 110 is installed between and connects the two road side apparatuses 109. An air flow barrier wall 108 is also located between and connects the two road center apparatuses 107. These walls are helpful for smoothing and keeping wind draft at desired directions.

The wind draft 106 flows into an air flow conduit of road side wind turbine apparatus 109. The wind draft 105 flows into a first air flow conduit of road center wind turbine apparatus 107, the wind draft 106 also flows into second air flow conduit of road center wind turbine apparatus 107.

Figure 2:
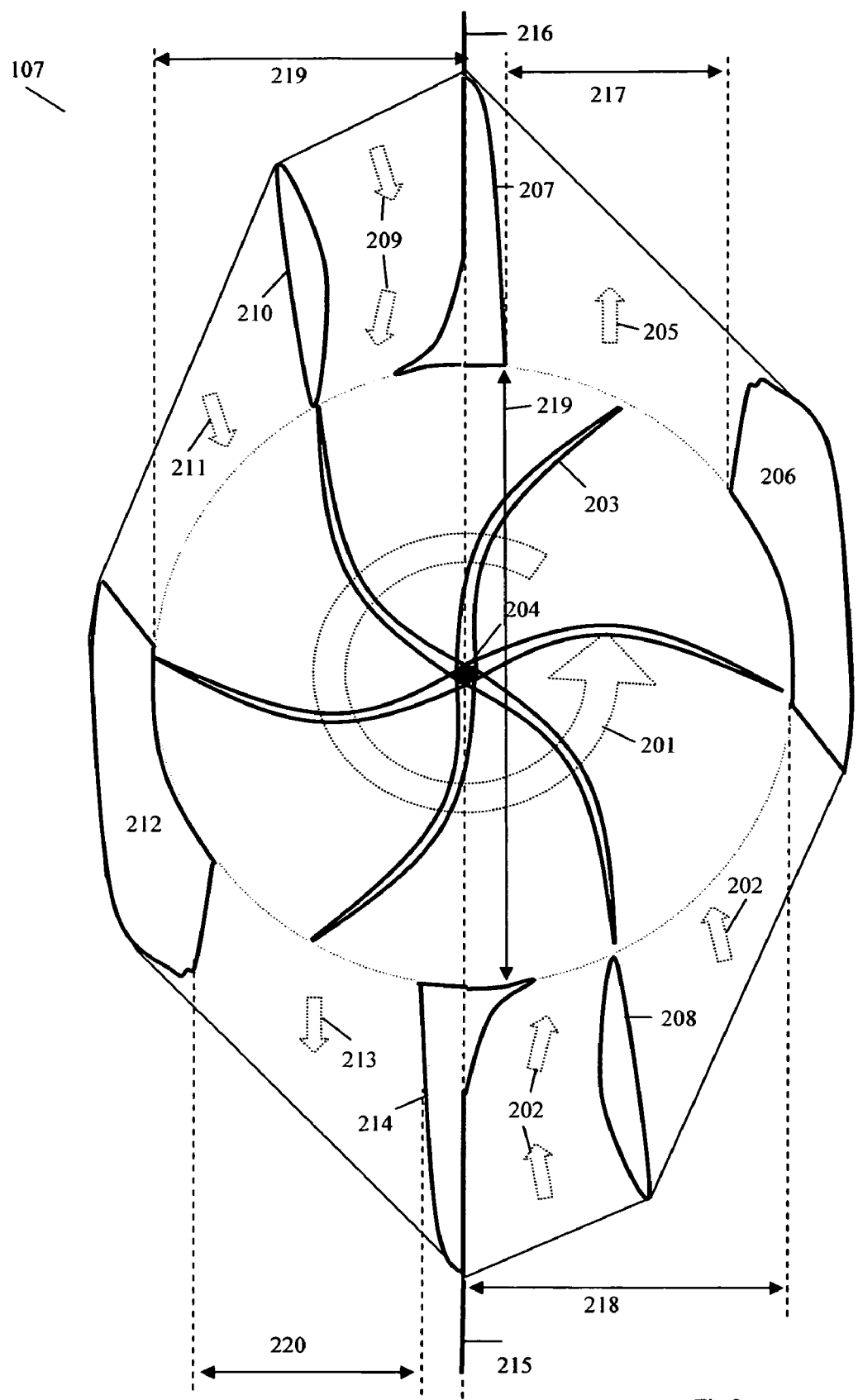
FIG. 2 is a top sectional view of a road center wind turbine apparatus of the present invention.

FIG. 2 is a top sectional view of a road center wind turbine apparatus 107. It has two air flow conduits and a blade assembly 203 in the middle. Firstly air flow conduit is limited by walls 207, 206, 214. It has an inlet opening 218, an outlet opening 217 and a middle opening 204. The second air flow conduit is limited by walls 207, 214, 212. It has an inlet opening 219, an outlet opening 220 and a middle opening 204. When firstly air flow 202, 205 travels through the first air flow conduit, it will push the blade assembly 203 to rotate at a second rotational direction 201. When the second air flow 209, 213 travels through the second air flow conduit, it also pushes blade assembly 203 to rotate at a second rotational direction 201. The blade assembly axis 204 also rotates at the same direction and can drive an electrical power generator to generate power.

Figure 3:
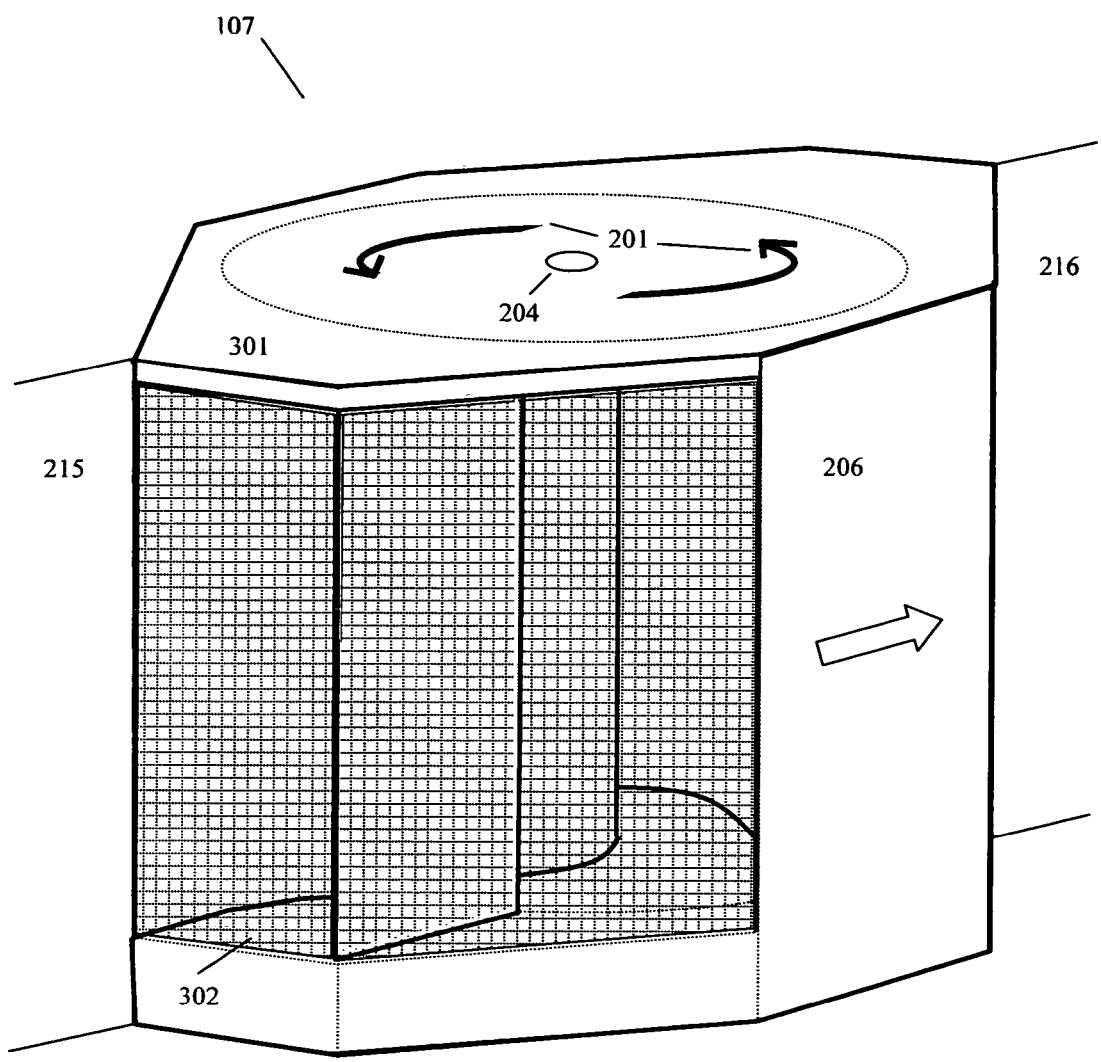
FIG. 3 is a perspective view of a road center wind turbine apparatus according to the present invention.
Figure 4:
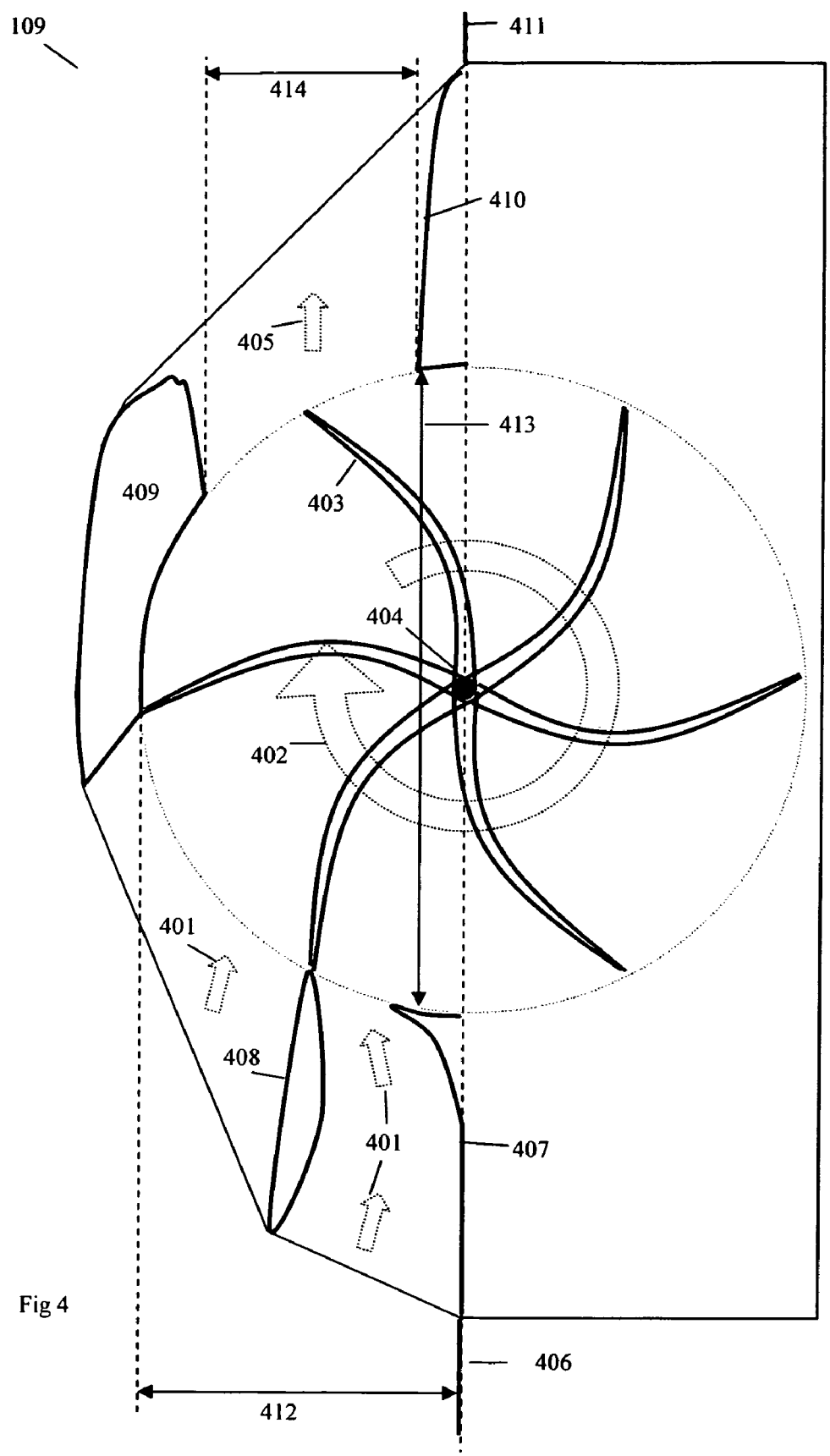
FIG. 4 is a top sectional view of a road side wind turbine apparatus of the present invention.
Figure 5:
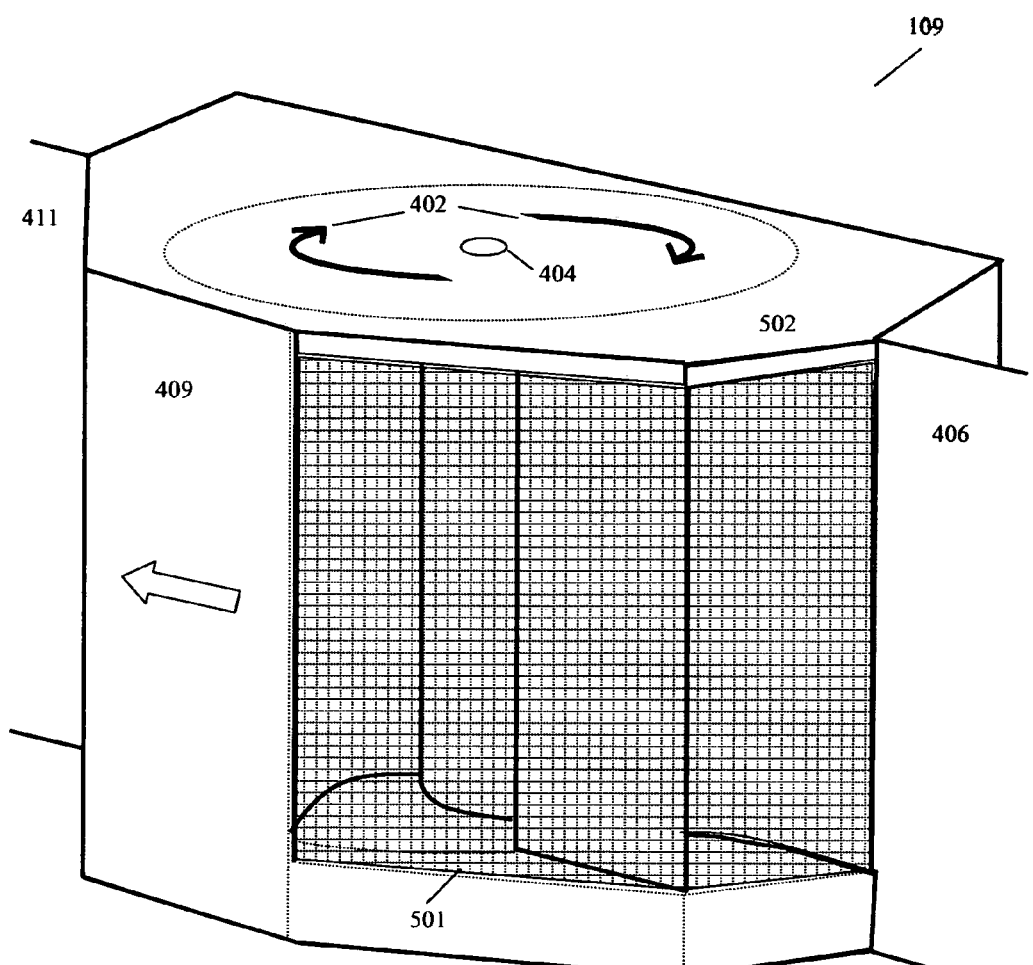
FIG. 5 is a perspective view of a road side wind turbine apparatus of the present invention.

FIG. 3 shows the housing 301 of road center wind turbine apparatus 107. Portions of housings 215, 216 are connected to the air flow barrier wall 108. Mesh grilles 302 are used to protect apparatus from road debris and insects.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

I claim:

1. A wind power generation system comprising:
   (a) a plurality of road side wind turbine apparatuses capable of being mounted at each side boundary line of a roadway, each of said road side wind turbine apparatuses having a wind turbine, an electrical power generator, an air flow conduit and a housing shell,
   said air flow conduit being formed on a half of the apparatus facing roadway traffic, extending along a direction of air flow caused by roadway traffic, the air flow conduit having an inlet opening opens toward the opposite direction of roadway traffic, an outlet opening opens toward the direction with roadway traffic, and a middle opening that allows the road side wind turbine to work with air flow passing through said air flow conduit,
   said housing shell enclosing wind turbine apparatus to provide protection except at said inlet and said outlet opening, and
   said wind turbine located between the inlet and outlet openings and having a blade assembly for rotation in a first rotational direction about a vertical rotation axis in response to air flow from said inlet opening to said outlet opening, and a shaft carried by said blade assembly for rotation and being connected to said electrical power generator to produce electrical power;
   (b) a plurality of road center wind turbine apparatuses capable of being mounted at a central traffic divider in the middle of a two way traffic roadway which has one of two opposite traffic directions on each side, said road center wind turbine apparatus having a wind turbine, an electrical power generator, two air flow conduits with opposite directions and a housing shell,
   the first air flow conduit being on the half of apparatus facing the first roadway traffic, extending along the direction of air flow caused by first roadway traffic,
   said first air flow conduit having an inlet opening which opens toward the direction of first roadway traffic, an outlet opening opens toward the direction alone with said first roadway traffic and a middle opening that cause said road center wind turbine to work with air flow traveling through said first air flow conduit,
   the second air flow conduit being on the half of apparatus facing the second roadway traffic, extending along the direction of air flow caused by second road way traffic,
   said second air flow conduit having an inlet opening opens against the direction of second roadway traffic, an outlet opening opens toward the direction alone with second roadway traffic and a middle opening that allows wind turbine to work with air flow that travels through this said second air flow conduit,
   said housing shell enclosing said entire wind turbine apparatus to provide protection except at said inlet and outlet opening, and
   said road center wind turbine being located between said first and said second air flow conduits and having a blade assembly for rotation in a second rotational direction about a vertical rotation axis in response to said first and second air flows, and a shaft carried by said blade assembly for rotation and being connected to a said electrical power generator to produce electrical power.

2. The wind power generation system recited in claim 1 wherein an air flow barrier wall is installed between and serves to connect two nearby road side wind turbine housings at a side of a roadway for guiding air flow between.

3. The wind power generation system recited in claim 1 wherein an air flow barrier wall is installed between and serves to connect two nearby said road center wind turbine housings at a middle of a roadway for guiding air flow between them.

4. The wind power generation system recited in claim 1 wherein a plurality of mesh wire grilles are used to cover all openings on both road side and road center wind turbine apparatuses to prevent road debris or insects from entering into those apparatuses without stopping airflow.

5. The wind power generation system recited in claim 1 wherein both road side and road center apparatuses provide mounting points for road guiding rails.

* * * * *